Patented May 31, 1932

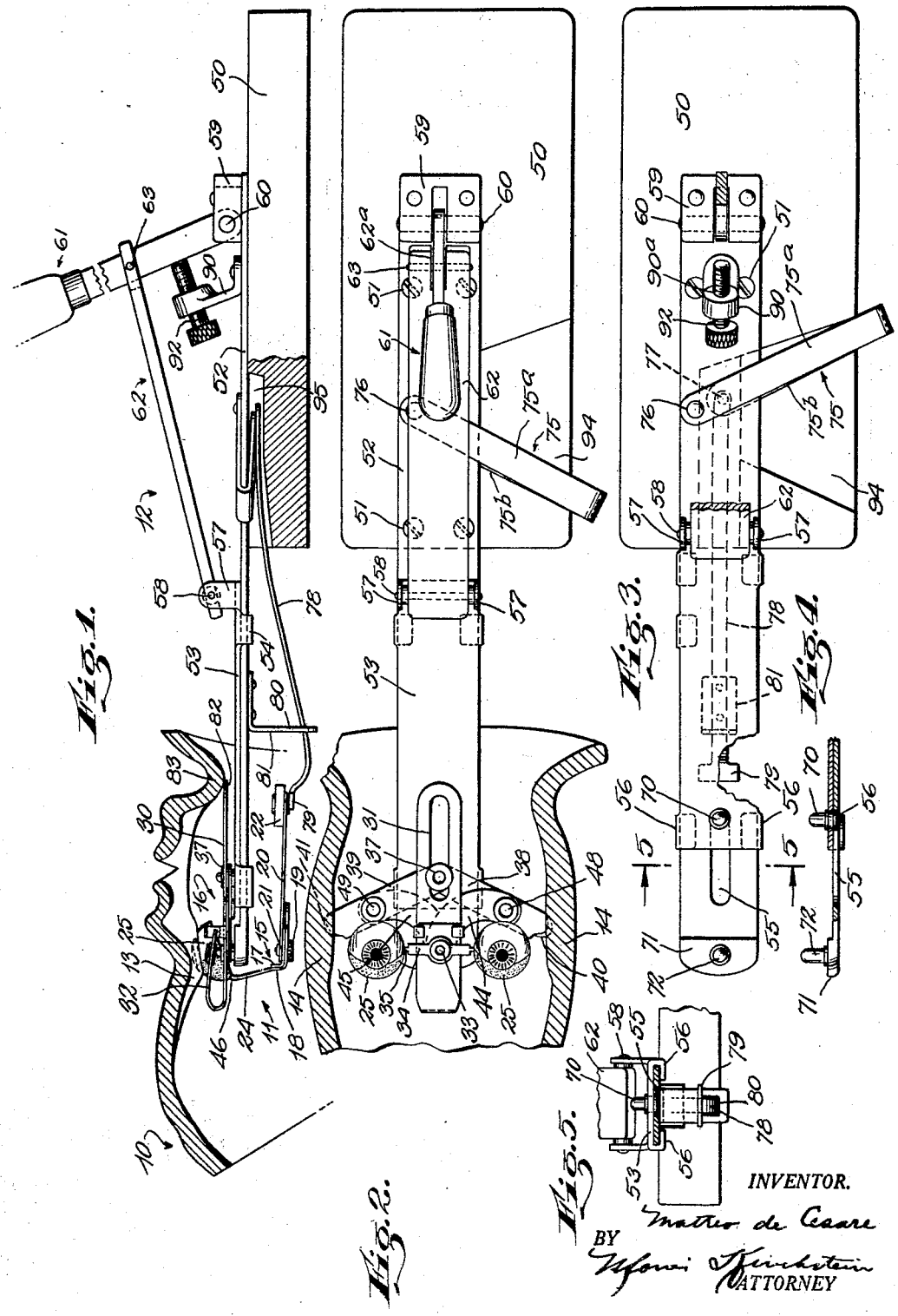

1,861,050

UNITED STATES PATENT OFFICE

MATTEO DE CESARE, OF NEWARK, NEW JERSEY

DOLL

Application filed April 2, 1931. Serial No. 527,075.

This invention relates to dolls and is particularly directed to an instrument for attaching a rolling doll's eye set, such for example as shown and described in my co-pending application, Serial No. 527,076, filed on the 2nd day of April, 1931, to a doll's head.

An object of this invention is to provide an instrument of the character described having means for permitting rolling of the doll's eyes without removing the instrument after attaching the eye set within the doll's head, thus serving as a test to insure proper mounting of the eye set within said head.

A further object of this invention is to provide a strong, rugged and compact instrument of the character described, which shall have comparatively few and simple parts, be relatively inexpensive to manufacture, easy to manipulate and withal practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a doll's head and an instrument embodying the invention for attaching an eye set to said head;

Fig. 2 is a top plan view of the structure shown in Fig. 1 with the front part of the doll's head removed;

Fig. 3 is a top plan view of the instrument showing another position thereof;

Fig. 4 is a side elevational view of the eye set gripping means with parts in cross-section; and Fig. 5 is a cross-sectional view taken on line 5—5 of Fig. 3.

Referring now in detail to the drawings, 10 designates a doll's head to which there is attached a rolling eye set 11 by means of an instrument 12 embodying the invention. The head 10 is made of usual construction having sockets 13 and thickened side wall portions 14. The eye set 11, described in detail in my said co-pending application comprises generally an eye frame 15 having a device 16 pivoted thereto for mounting the frame in the head. The frame 15 comprises a pair of nested longitudinally adjustable angle-shaped members 17 and 18 having aligned slots receiving the shank of a thumb screw 19 therethrough, said screw being screwed to an elongated strip 20 having a screw threaded opening at the end portion 21 thereof for receiving the shank of said thumb screw. A weighted member 22 may be attached to the outer end of said strip 20 for the purpose hereinafter described. Extending forwardly from each of the members 17 and 18 is an arm 24 to which there may be attached in any suitable manner an eye ball 25 received in one of the sockets 13.

The device 16 comprises an elongated, flat strip 30 formed with a longitudinal slot 31 and with a resilient or yieldable bent over portion 32. Attached to said bent over portion 32 as for example, by means of an eyelet 33 is a transverse member 34 having outwardly extending pintle portions 35 slidably and rotatably extending into suitable openings in the eye balls 25. Pivoted at their inner ends to a common eyelet 37 slidably extending within said slot 31 are a pair of arms 38 and 39 having knife edges 40 and 41 at the outer ends thereof. A pair of links 44 and 45 are pivoted together at the inner ends thereof and to said strip 30 by a common eyelet 46; and are also pivoted at the outer ends 48 and 49 thereof to intermediate portions of the arms 38, 39. It will now be seen that upon forcing the eyelet 37 to the left (Fig. 2), the outer knife edges 40, 41 of the arms 38, 39 will dig into the side wall portions 14 of the doll's head for firmly attaching the device 16 to said head.

With the device 16 attached to the head, the eye frame 15 will be pivoted about the pintle portions 35 whereby upon tilting the doll backwards the weighted member 22 will drop downwardly for rolling the eyes. It will be noted that the resilient bent over portion 32 yieldably presses the eye balls 25 into the eye sockets 13. The pressure of the eye balls on the sockets, however, is not sufficient to prevent rolling of the eyes upon tilting the doll backwards.

The instrument 12 for actuating the device 16 for attaching the same to the doll's head, comprises a block of wood or the like material 50 to which there is attached, for example, by means of a plurality of screws 51, an elongated flat strong strip of metal 52 projecting beyond said block. Slidably mounted on the top of said strip 52 is a plate 53 having downwardly and inwardly bent portions 54 engaging the side edges of said strip 52. For limiting the longitudinal movement of said plate 53, the strip 52 may be provided with a longitudinal slot 55 and the plate with a pin 70 having a downwardly projecting lug 56 extending into said slot 55. For causing slidable movement of said plate 53, the same is provided, at one end thereof, with a pair of upwardly projecting ears 57 on which there is mounted a transverse pin 58. At the rear end of the strip 52 there is likewise provided a slotted member 59 on which there is mounted a transverse pin 60. Pivoted to said pin 60 is a handle member 61 adapted to be gripped at the upper end thereof for moving the same forwardly and rearwardly. A link 62 pivoted at one end thereof to said pin 58 is provided with a slot 62a at the opposite end thereof which receives a portion of the handle 61. A transverse pin 63 extending through the slotted portion of said link 62 serves to pivotally attach said link to the handle 61. It will now be clear that the handle member 61 may be pivotally moved forwardly or rearwardly for causing sliding movement of the plate 53.

The outer end of the strip 52 may be provided with a raised portion 71 to which there is fixed an upwardly extending pin 72 aligned with said pin 70. The pin 72 preferably extends to somewhat greater height than said pin 70. For the purpose hereinafter described, there is provided an actuating arm 75 formed of a bent over strip of metal having an upper portion 75a pivoted to the upper surface of the strip 52 as at 76, and a lower portion 75b terminating beneath the strip 52. Pivoted to the outer end of the said portion 75b as at 77 is an elongated downwardly curved bar 78 terminating in a head 79. The bar 78 is disposed substantially longitudinally of the strip 52 and extends through an opening 80 in a downwardly projecting member 81 fixed to the underside of said strip 52. It will now be seen that upon pivotally moving the arm 75, the rod 78 will be projected forwardly or retracted.

For mounting the eye set 11 on the head 10 the mounting device 16 is placed on the left end of the tool 12 by passing the pin 72 through the central opening in the eyelet 46 and the pin 71 through the opening in the eyelet 37. The handle 61 may then be pivotally moved rearwardly for drawing the eyelet 37 back and bringing the outer knife edges of the arms 38, 39 inwardly toward the mid-portion of the eye set. The weighted member 22 is then moved upwardly towards the strip 52 and the actuating arm 75 pivoted forwardly. In this position of the instrument, the outer end of the strip 20 will rest on the head 79 of the bar 78. The eye set may then be moved, by properly manipulating the instrument or the doll's head, to bring the eye set within the head and the eye balls 25 within the sockets 13. The head 10 may then be pressed downwardly, the outer end 82 of the strip 30 being pressed against the neck portion 83 of the head. It will be noted that the pin 72 which projects through the eyelet 46 will contact the inner surface of the bent over resilient portion 32 and prevent the same from being pressed too close to the adjacent portion of the strip 30. The pin 72 thus serves to limit the position of the bent over portion 32 with respect to said strip 30.

The handle 61 may then be moved forwardly for forcing the eyelet 37 toward the eyelet 46. This movement will cause the outer ends 40, 41 of the arms 38, 39 to dig into the side walls of the head for rigidly mounting the device 16 onto the head. The pin 72 may be of such dimensions as to retain the bent over portion 32 in proper position to yieldably press the eye balls 25 against the sockets 13 and nevertheless permit the eye balls to roll upon dropping the weight 22. After the set is attached to the head, the arm 75 may be pivotally moved rearwardly to the position shown in Fig. 4 to draw the head 79 away from the strip 20 and permit the latter to drop under action of the weight 22. This operation serves as a test: If the eye balls roll it is an indication that the attachment is proper and that the member 32 does not press too hard on the eye balls for clamping or binding the same with respect to the sockets. If the eyes roll properly, the head may then be raised to disengage the pin 71, 72 from the eyelets 37, 46, and the instrument 12 may then be removed from the head. Obviously, the instrument 12 may be used for detaching the eye set from the head by placing the pins 71, 72 through eyelets 37, 46 and pulling handle 61 backwards for releasing the cutting edges 41 from the doll's head.

Means is provided for adjustably limiting the forward movement of the handle 61 whereby the amount of outward movement of the cutting edges 40, 41 may be controlled. To this end there is fixed to the upper surface of said strip 52, somewhat forwardly of said member 59, an upwardly projecting member 90 having a screw threaded opening 90a aligned with said handle 61. A set screw 92 screwed through said screw threaded opening, is adapted to abut said handle 61. It will thus be seen that the forward movement of the handle may be adjustably limited by properly manipulating said screw 92 and hence preventing the danger of the edges 40, 41 from digging too deeply or through the side walls of the doll's head.

The block 50 may furthermore be formed with cut out portions 94 and 95 to receive and permit free movement of the arm 75 and the bar 78.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. For supporting and operating a doll's head, a pair of doll's eyes, and toggle mechanism attachable to said head for mounting said eyes within said head, means for actuating said mechanism to effect the attachment, said means including a member adapted to engage a fixed portion of said mechanism and a member adapted to engage a movable portion of said mechanism and means for moving said second member relative to said first member.

2. An instrument for supporting and operating an eye set which comprises a supporting portion with a hole therein and an operating means also with a hole therein, said instrument comprising an elongated member, an upwardly extending pin fixed to said member adapted to engage within one of said holes, a plate slidably mounted on said member, an upwardly projecting pin fixed to said plate and adapted to engage within the other of said holes, and means for causing sliding movement of said plate.

3. An instrument for supporting and operating an eye set which comprises a supporting portion with a hole therein and an operating means also with a hole therein, said instrument comprising an elongated member, an upwardly extending pin fixed to said member adapted to engage within one of said holes, a plate slidably mounted on said member, an upwardly projecting pin fixed to said plate and adapted to engage within the other of said holes, and means for causing sliding movement of said plate, said means comprising a handle pivoted to said member, and a link interconnecting said plate and an intermediate portion of said handle.

4. An instrument for supporting and operating an eye set which comprises a supporting portion with a hole therein and an operating means also with a hole therein, said instrument comprising a block, a strip fixed thereto and extending therefrom, an upwardly extending pin fixed to said strip adapted to engage within one of said holes, a plate slidably mounted on said strip, an upwardly projecting pin fixed to said plate and adapted to engage the other of said holes, and means for causing sliding movement of said plate, said means including a handle pivoted to said strip and a link interconnecting said handle with said plate.

5. An instrument for supporting and operating an eye set which comprises a supporting portion with a hole therein and an operating means also with a hole therein, said instrument comprising a block, a strip fixed thereto and extending therefrom, an upwardly extending pin fixed to said strip adapted to engage within one of said holes, a plate slidably mounted on said strip, an upwardly projecting pin fixed to said plate and adapted to engage the other of said holes, and means for causing sliding movement of said plate, said means including a handle pivoted to said strip, a link interconnecting said handle with said plate, and means for adjustably limiting movement of said handle.

6. An instrument for supporting and operating an eye set which comprises a supporting portion with a hole therein and an operating means also with a hole therein, said instrument comprising a block, a strip fixed thereto and extending therefrom, an upwardly extending pin fixed to said strip adapted to engage within one of said holes, a plate slidably mounted on said strip, an upwardly projecting pin fixed to said plate and adapted to engage the other of said holes, means for causing sliding movement of said plate, a bar disposed beneath and longitudinally of said strip and means for moving said bar longitudinally of said strip.

7. For supporting and operating a doll's head and an eye set comprising a pair of doll's eyes, a frame member attached to said eyes, a pair of arms pivoted together and to said member by a common pivot, and having outer ends adapted to dig into the side wall portions of said head, means for causing pivotal movement of said arms, said means comprising a member having a portion adapted to engage a fixed portion of said member, a portion adapted to engage said common pivot and means for causing relative movement between said pivot and member.

8. For supporting and operating a doll's head and an eye set comprising a pair of doll's eyes, a member pivotally attached to said eyes, a pair of arms pivoted together and to said member by a common pivot, means for causing pivotal movement of said arms, said means comprising a second member adapted to engage a fixed portion of said first member, another member adapted to engage said common pivot, means for causing relative movement between said pivot and first member, and means associated with said means for supporting said eyes against pivotal movement.

9. For supporting and applying a doll's head having eye sockets, a member attachable to said head, a pair of eyes pivoted on said member, said member having means for yieldingly pressing said eyes into said sockets, a weighted member fixed to said eyes to cause rolling thereof, means for attaching said member to said head, said means including movable means for supporting said weighted member to prevent rolling of said eyes, and means for moving said movable means without detaching said attachment means, to release said weighted member and cause rolling of the eyes.

10. For supporting and applying a doll's head having eye sockets, a member attachable to said head, a pair of eyes pivoted on said member, said member having means for yieldingly pressing said eyes into said sockets, a weighted member fixed to said eyes to cause rolling thereof, means for attaching said member to said head, said means including means for supporting said weighted member to prevent rolling of said eyes, and means for releasing said supporting means without removing said attaching means from said member to permit swinging of said weighted member and rolling of said eyes.

11. A device for supporting and operating an eye set which includes a supporting portion and an operating portion, said instrument comprising a member having a portion adapted to engage said supporting portion, a member slidably mounted on said first member, adapted to engage said operating portion, and means for causing sliding movement of said second member.

12. A device for supporting and operating a doll's head, a pair of doll's eyes and toggle mechanism carrying said eyes and attachable to said head for mounting said eyes within said head, said device having means for supporting the doll's eyes and toggle mechanism, and means to effect the attachment between said toggle mechanism and said head.

13. In a device for supporting and applying a doll's head having eye sockets, a member attachable to said head, a pair of eyes pivoted on said member, said member having means for pressing said eyes into said socket, and a weighted member fixed to said eyes adapted to cause rolling thereof, means for attaching said first member to said head, said latter means including a member for supporting said weighted member to prevent rolling of said eyes, said supporting member being movable with respect to said attaching means to release said weighted member and cause rolling of the eyes.

In testimony whereof I affix my signature.

MATTEO DE CESARE.